Oct. 26, 1926.

Re. 16,445

J. E. SCHMIDT ET AL

ROD STRAIGHTENING MACHINE

Original Filed Dec. 5, 1921 2 Sheets-Sheet 1

Inventor:
John E. Schmidt
and Clyde E. McArthur
By Fred Gerlach
Their Atty.

Oct. 26, 1926. Re. 16,445

J. E. SCHMIDT ET AL

ROD STRAIGHTENING MACHINE

Original Filed Dec. 5, 1921 2 Sheets-Sheet 2

Inventors:
John E. Schmidt
and Clyde E. McArthur
By Fritz Gerlach
their Atty.

Reissued Oct. 26, 1926. Re. 16,445

UNITED STATES PATENT OFFICE.

JOHN E. SCHMIDT AND CLYDE E. McARTHUR, OF CHICAGO, ILLINOIS.

ROD-STRAIGHTENING MACHINE.

Original No. 1,418,026, dated May 30, 1922, Serial No. 519,935, filed December 5, 1921. Application for reissue filed June 21, 1923. Serial No. 646,925.

This invention has relation to machines for straightening rods of various sizes, and it consists in certain peculiarities of the construction, novel arrangement and combination of the various parts thereof as will be hereinafter more fully set forth and specifically claimed.

The principal object of our invention, is to furnish a rod straightening machine of simple and inexpensive construction, of great durability and strength, positive and highly efficient in operation, as well as one which shall be extremely easy to operate and in which the operation thereof and the feeding of rods thereto may be performed by one person only.

Another object is the provision of a machine of the character above referred to, which shall be of such construction and arrangement of its parts, that the operation of straightening rods thereby will be performed by the impact thereon of a movable die or member cooperating with a complemental fixed die or member, as the rods are fed between said dies.

Other objects and advantages of the invention will appear from the following description and explanation.

In the accompanying drawings, which serve to illustrate an embodiment of the invention—

Figure 1:
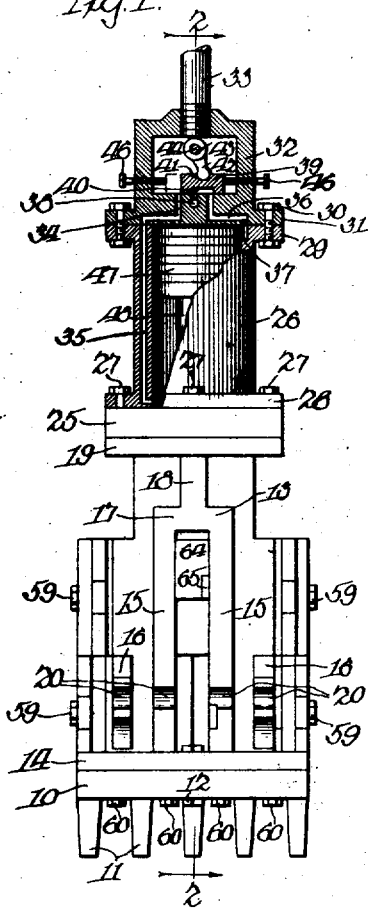
Figure 2:
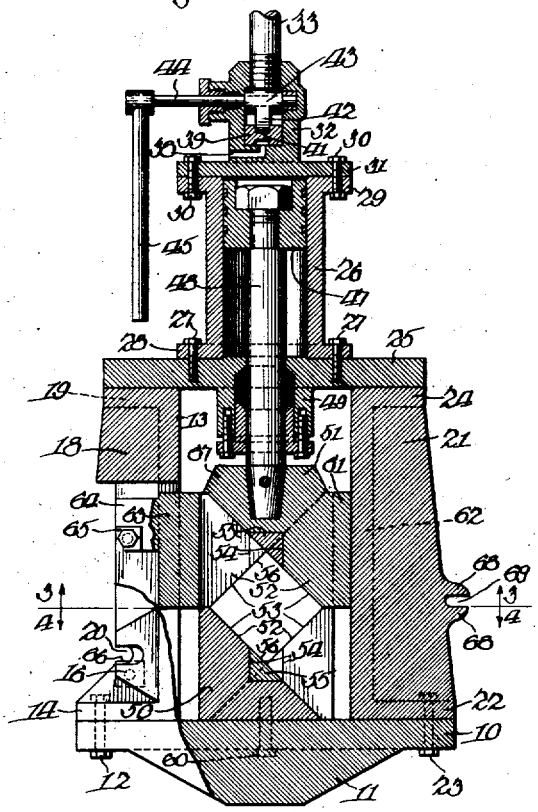
Figure 6:
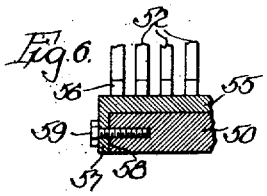
Figure 3:
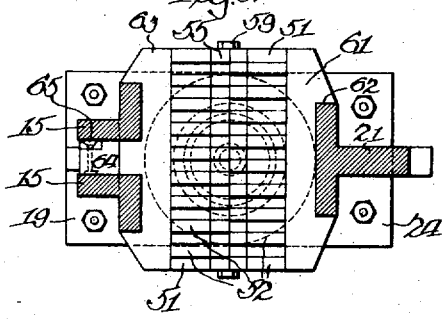
Figure 4:
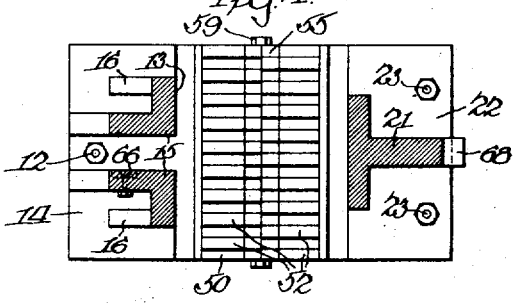
Figure 5:
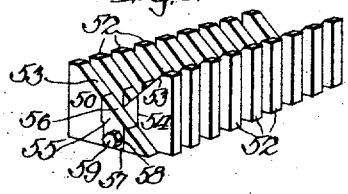

Fig. 1 is a view in side elevation partly in section of a machine embodying our improvements, showing the movable or impact die thereof, as well as the piston of the cylinder, in its raised position. Fig. 2 is a central vertical sectional view taken on line 2—2 of Fig. 1 looking in the direction indicated by the arrows. Fig. 3 is a bottom plan sectional view taken on line 3—3 of Fig. 2. Fig. 4 is a plan view taken on line 4—4 of Fig. 2. Fig. 5 is a detached perspective view of one of the rod straightening dies, and Fig. 6 is a fragmental sectional view of one of said dies showing the manner of detachably securing an insert thereto.

Like numerals of reference refer to corresponding parts throughout the different views of the drawings.

Referring now more particularly to Figs. 1 and 2 of the drawings, the reference numeral 10 designates the base of the machine, which may be of any suitabe size, form and material, but by preference rectangular in shape and provided on its lower surface with a series of spaced depending ribs 11 for the purpose of reinforcing said base. Mounted on the upper surface of the base and secured thereto by means of screw bolts 12, is an upright guide member which is designated as a whole by the reference numeral 13, and comprises a horizontally disposed base 14 at its lower end from which is upwardly extended a pair of spaced parallel guides 15 for cooperation with a portion of the movable or impact die of the machine.

The base 14 of the guide member 13 also has upwardly extended therefrom a number of vertically disposed uprights 16 which terminate at their upper ends on a horizontal line about flush with the upper surface of the stationary die. The upper ends of the guides 15 are united by a transverse portion 17 from which is upwardly extended a rib 18 on the upper end of which is located or formed a horizontal top 19 as will be readily understood by reference in Figs. 1 and 2 of the drawings. The outer faces of the uprights 16 and guides 15 are provided with transversely disposed circular recesses 20 which as shown are horizontally aligned and are for the purposes to be presently explained.

Mounted on the upper surface of the base 10 near the opposite side thereof from the guide 13 is another guide member, which is designated as a whole by the numeral 21 and is T-shaped in cross-section as shown. The guide member 21 has a floor 22 at its lower end to rest on the base 10 to which it is secured by means of screw bolts 23 or otherwise. The upper end of the guide member 21 is provided with a horizontally disposed top 24 which lies flush with the top or portion 19 of the guide member 13 and together with said portion 19 supports the base plate or lower head plate 25 of a vertical cylinder 26 which may be secured at its lower end to said plate by means of screw-bolts 27 extended through suitable openings in an annular flange 28 on the cylinder 26 and into suitable openings in the plate 25, which latter plate is secured in any suitable manner to the portions 19 and 24 of the guide members 13 and 21 respectively.

Mounted on the upper end of the cylinder 26 and secured to an annular flange 29 by means of screw bolts 30, is the base 31 of the valve casing 32 which has communication through a pipe 33 with a supply of compressed air or other motive fluid not shown. This valve casing has leading therefrom through its base an inlet port 34 which communicates with a port 35 with which the cylinder 26 is provided in its wall. As shown, the port 35 extends to a point near the bottom of the cylinder and communicates at said point with the cavity thereof. The valve casing 32 is also provided with an outlet port 36 which communicates at one of its ends with an outlet port 37 with which the cylinder 26 is provided in the upper portion of its wall.

Between the adjacent ends of the ports 34 and 36, the base 31 of the valve casing is provided with an exhaust port 38 which leads from the cavity of said casing to the atmosphere. Slidably mounted in the cavity of the casing 32 is a valve 39 which has in its lower surface a port or recess 40 of sufficient length to encompass the exhaust port 38 and the outlet port 36, or the inlet port 34 and the exhaust port 38, alternately. The upper surface of the valve 39 is provided with a concave recess 41 for the reception of the rounded end of an arm 42 extended from a sleeve 43 which is fixed on a rocker bar 44 horizontally journaled in the valve casing 32 and extended outwardly thereof at one of its ends. Mounted on the outwardly extended portion of the rocker bar 44 is a hand lever 45 by means of which said bar can be turned in the proper direction to cause the valve 39 to co-operate with the ports of the valve casing so as to admit motive fluid to the cylinder or to be exhausted therefrom. At opposite sides the valve casing 32 is provided with a stop rod 46 which rods are extended into the valve casing at either end of the valve 39 and may be employed for restricting its movements.

Slidably mounted in the cylinder 26 is a piston 47 which has downwardly extended therefrom a piston rod 48 which passes through a suitable opening in the base plate 25, which plate is equipped on its lower surface with a stuffing box 49 which surrounds the rod 48 and may be of the usual or ordinary construction. It will be noted, by reference to Fig. 1, that the lower end of the inlet channel or port 35 communicates with the cavity of the cylinder at a slight distance above the bottom thereof, and that the outlet channel 37 communicates with the cavity of the cylinder at a slight distance below the top thereof. By this arrangement air cushions will be provided at the ends of the cylinder so as to prevent the piston 47 striking them and thereby causing injury to the same.

Mounted transversely on the base 10 between the adjacent surfaces of the guides 13 and 21, is a die or rod-straightening member, which is designated as a whole by the numeral 50, see Figs. 2, 4 and 5 of the drawings. This die 50 and the impact or movable die of the machine, which is designated as a whole by the numeral 51, are, on their adjacent surfaces, complementary to each other and on their adjacent surfaces, their constructions are counterparts of one another. In Fig. 5 is shown a perspective view of the die 50, from which view it will be understood that the same is in the form of an elongated block of rectangular shape in outlines, and that it is provided at each of its sides with a plurality of spaced upwardly extended parallel arms 52, the arms on one side of the die being arranged in coincidence with the spaces between the arms 52 on the other side of the die. These arms have their upper inner surfaces inwardly and downwardly beveled as at 53, which beveled portions intermediate their ends have angular recesses 54, which recesses extend longitudinally throughout the length of the die and are for the reception of an insert 55 of a shape and size in cross-section to fit snugly in said recesses. This insert is provided in its surface adjacent the beveled faces 53 of the arms 52, with a longitudinally extended angular recess 56, the angles of which recess coincide with the inclined faces 53 of the arms of the die. The insert 55 has at each of its ends a down-turned apertured tongue or flange 57, which are seated in countersunk recesses 58 in the ends of the die 50, see Figs. 5 and 6, and said tongues are secured in place by means of screw-bolts 59 extended through the openings in said tongues and engaging openings in the ends of the said die. The die 50 is secured to the base 10 on which it rests by means of screw-bolts 60 extended upwardly through the base and engaging suitable openings in the bottom of the die as will be observed by reference to Figs. 1 and 2. The guides 13 and 21 are spaced from the sides of the die 50 and perform no function with respect thereto except to guide the movable die 51 so that it will cooperate accurately with the stationary die. As before stated, the impact or movable die 51 is, on its surface adjacent the die 50, a counterpart in construction, and the above description with reference to the die 50, is believed to accurately describe the lower surface of the die 51, except that it will be understood that the arms 52 of the die 51 are extended downwardly and that the beveled faces 53 of said arms as well as the angular recess 56 of the insert 55, are extended upwardly instead of downwardly. The die 51 has at one of its side walls an outward extension 61 which is provided in its outer surface with a recess 62 to co-act with the adjacent portion of the guide member 21 so as to permit of vertical movement of the movable die. The opposite side wall of this die is provided with an outward extension 63 which has about midway between its ends a lateral projection 64 which fits snugly between the adjacent surfaces of the guide members 15 of the guide 13. This lateral projection 64 may have mounted on the lower portion of one of its sides a cutting member or die 65 to co-act with a cutting member 66, see Figs. 2 to 4, mounted on the surface of one of the members 15 adjacent the projection 64 for the purpose of cutting off rods which may be placed in the recesses 20 in the lower portion of the outer faces of the members of the guide 13, as will be readily understood by reference to Figs. 1, and 2, of the drawings. The impact or movable die 51 is provided on its upper surface with a vertically apertured boss 67, in which aperture the lower end of the piston rod may be secured in any suitable manner. The outer face of the guide 21 is provided on the lower portion thereof with a pair of laterally extended spaced projections 68 which provide a recess 69 into which recess a portion of a rod which has been bent into loop form can be placed, while the other member of the loop will extend above or below one of the projections 68, when by moving the rod upwardly or downwardly, it is evident the loop can be straightened to such an extent that the rod can be placed in the square or rectangular opening provided by the complementary dies of the machine.

The construction and arrangement of the members of these dies are such that the arms 52 of one of them will fit and operate in the spaces between the arms of the other die, so that in the reciprocation of the piston in the cylinder, the movable die will be caused to telescope with the fixed die, in which operation it will be understood that the square opening between said dies will be maintained in such form but will be diminished in size according to the distance downwardly that the movable die may be forced.

By placing an imperfect or bent rod longitudinally in the opening between the dies and permitting it to rest on the adjacent inclined faces 53 of the stationary die and in the recess 56 of the lower insert, it is manifest that by turning the hand lever 45 in the proper direction to permit compressed air or steam to pass from the valve chamber 32 through the ports 36 and 37 into the upper end of the cylinder, the piston 47 and the movable die 51 which it carries, will be moved downwardly with great force against the rod, positioned as above stated, which operation will remove all of the kinks and bends of that portion of the rod exposed to the action of the dies.

As the die members will be subjected, mainly, to the wear and stress incident to the operation of the machine, at the apexes of their angular sockets, we employ the inserts which are by preference made of manganese steel, but may be of any other suitable material, which inserts are detachably mounted on the dies so as to permit them to be removed and replaced if necessary.

In this machine, the straightening action is produced by bringing the opposing series of faces together, the dies being formed to alternately engage and bend the metal in directions substantially 90° apart and a distinguishing characteristic of the invention is that the opposing elements are transversely aligned so that the rod will be engaged at points disposed oppositely of one another and, as a result of this arrangement, the dies will straighten the rod without any shearing action between adjacent die elements. Furthermore, they do not tend to form waves in the rod as will occur when the opposing die-faces are offset and contiguous.

Having thus described the invention, what we claim as new and desire to secure by Letters Patent, is:

1. In a machine of the class described, the combination of a pair of die-members, each having a pair of series of die-faces, the faces of one series of each member being relatively inclined and staggered with respect to the faces of the other series on the same member, each series of faces of each of the members being transversely aligned and parallel with and opposed to a series of faces on the other die-member, the faces of each series of each of the members being spaced apart to receive between them die-faces of a series on the other member, and means for shifting one of the members relatively to the other and in a rectilinear path to maintain at all times the parallelism of the opposed faces.

2. In a machine of the class described, the combination of a pair of die-members, each having a pair of series of die-elements having relatively inclined faces, one series of die-faces of each member being opposed and extending parallel to one series of die-faces on the other member, the elements of each series being spaced apart and transversely aligned, the elements of one series of each member alternating with the elements of the other series on the same member to form spaces to receive the elements on the other member, mechanism for reciprocating one of the members relatively to the other and in a rectilinear path so as to maintain at all times the parallelism of the opposed die-faces.

3. In a machine of the class described, the combination of a frame provided with a rectilinear guide-way, a die-member fixedly mounted on the frame and at one end of the way, a die-member movably mounted and guided by said way in a rectilinear path, said die-members each having a pair of series of die-faces, the faces of one series of each member being relatively inclined and staggered with respect to the faces of the other series on the same member, each series of faces of each of the members being transversely aligned and parallel with and opposed to a series of faces on the other die-member, the faces of each series of each of the members being spaced apart to receive between them die-faces of a series on the other member, and means for reciprocating the movable member.

4. In a machine of the class described, the combination with a fixed die member, of a die member movable with respect thereto, said members being constructed to form complemental opposed angular sockets to embrace a rod and to telescope one with the other, an insert seated in each member at the apex of its socket and having an angular recess with its walls coinciding with the walls of the socket, and means to reciprocate the movable member.

5. In a machine of the class described, the combination with a fixed die member, of a die member movable with respect thereto said members being constructed to form complemental opposed angular sockets to embrace a rod and to telescope one with the other, an insert detachably seated in each member at the apex of its socket and having an angular recess with its walls coinciding with the walls of the socket, and means to reciprocate the movable member.

6. In a machine of the class described, the combination with a main frame provided with a guide-way, of a die member fixedly mounted thereon at one end of said way, a die member movably mounted and guided by said way, said die members having on the adjacent portions transversely disposed spaced arms, the arms at each side of each die member being alternately disposed and opposed and having their adjacent faces inclined in opposite directions at angles to one another, the arms of one of said members adapted to intermesh or telescope with the arms of the other member, the arms of said members being provided with complemental longitudinally extended opposed angular sockets to embrace a rod, and means connected to the movable die member for reciprocating the same.

7. In a machine of the class described, the combination with a main frame provided with a guide-way, of a die member fixedly mounted thereon at one end of said way, a die member movably mounted in and guided by said way, said die members having on their adjacent portions transversely disposed spaced arms, the arms of one of said members adapted to intermesh or telescope with the arms of the other member, the arms of said members being provided with complemental longitudinally extended opposed angular sockets to embrace a rod, an insert seated in each member at the apex of its socket and having an angular recess with its walls coinciding with the walls of the socket, and means to reciprocate the movable member.

8. In a machine of the class described, the combination with a main frame provided with a guide-way, of a die member fixedly mounted thereon at one end of said way, a die member movably mounted in and guided by said way, said die members having on their adjacent portions transversely disposed spaced arms, the arms at each side of each die member being alternately disposed and opposed and having their adjacent faces inclined in opposite directions at angles to one another whereby complemental longitudinally extended opposed angular sockets to embrace a rod are provided and whereby the arms of one of the die members are adapted to intermesh or telescope with the arms of the other member, and means to reciprocate the movable die member.

9. In a machine of the class described, the combination with a main frame provided with a vertical guide-way, of a die member fixedly mounted on the frame at the lower end of said way, a die member movably mounted in and guided by said way, said die members having on their adjacent surfaces at each of their sides transversely disposed spaced arms, the arms at each side of each die being alternately disposed and having their adjacent faces inclined in opposite directions at angles to one another whereby complemental longitudinally extended opposed angular sockets to embrace a rod are provided and whereby the arms of one of the die members are adapted to intermesh or telescope with the arms of the other member, a cylinder vertically mounted on the main frame above the guide-way thereof, a piston slidable in said cylinder and having connection with the said movable die member, and means to reciprocate the piston.

Signed at Chicago, Illinois this 24th day of May, 1923.

JOHN E. SCHMIDT.
CLYDE E. McARTHUR.